US012634412B2

(12) United States Patent
Dao et al.

(10) Patent No.: US 12,634,412 B2
(45) Date of Patent: May 19, 2026

(54) VIDEO-CONFERENCE ENDPOINT

(71) Applicant: Neatframe Limited, London (GB)

(72) Inventors: Duc Dao, London (GB); Håkon Skramstad, London (GB)

(73) Assignee: Neatframe Limited, London (GB)

( * ) Notice: Subject to any disclaimer, the term of this patent is extended or adjusted under 35 U.S.C. 154(b) by 103 days.

(21) Appl. No.: 18/288,931

(22) PCT Filed: May 27, 2022

(86) PCT No.: PCT/EP2022/064419
§ 371 (c)(1),
(2) Date: Oct. 30, 2023

(87) PCT Pub. No.: WO2022/248671
PCT Pub. Date: Dec. 1, 2022

(65) Prior Publication Data
US 2024/0214520 A1     Jun. 27, 2024

(30) Foreign Application Priority Data

May 28, 2021     (GB) ...................................... 2107641

(51) Int. Cl.
H04N 7/15          (2006.01)
G06T 7/20          (2017.01)
(Continued)

(52) U.S. Cl.
CPC .............. H04N 7/152 (2013.01); G06T 7/20 (2013.01); G06T 7/70 (2017.01); G06V 20/70 (2022.01);
(Continued)

(58) Field of Classification Search
CPC .......... H04N 7/152; H04N 7/147; H04N 7/15; H04N 5/2628; G06T 7/20; G06T 7/70;
(Continued)

(56) References Cited

U.S. PATENT DOCUMENTS 9,584,763 B2 *  2/2017  Tangeland ............. H04N 7/147
10,904,446 B1    1/2021  Ostap et al.
(Continued)

FOREIGN PATENT DOCUMENTS

CN       109443303 A     3/2019
CN       112672095 A     4/2021
(Continued)

OTHER PUBLICATIONS

EP 22733871.2, May 19, 2025, Third Party Observation.
(Continued)

*Primary Examiner* — Stella L. Woo
(74) *Attorney, Agent, or Firm* — Wolf, Greenfield & Sacks, P.C.

(57) ABSTRACT
A computer-implemented method of operating a video conference endpoint. The video conference endpoint includes a video camera which captures images showing a field of view. The method comprises: receiving data defining of a spatial boundary within the field of view, the spatial boundary being at least in part defined by a distance from the video camera; capturing an image of the field of view; identifying one or more persons within the field of view of the video camera; estimating a position of the or each person within the field of view of the video camera; and generating one or more video signals, which include one or more cropped regions corresponding to one or more persons determined to be within the spatial boundary, for transmission to a receiver.

20 Claims, 4 Drawing Sheets

(51) Int. Cl.

| | |
|---|---|
| *G06T 7/70* | (2017.01) |
| *G06V 20/70* | (2022.01) |
| *G06V 40/16* | (2022.01) |

(52) U.S. Cl.
CPC .......... *G06V 40/161* (2022.01); *G06V 40/171* (2022.01); *G06T 2207/20132* (2013.01); *G06V 2201/07* (2022.01)

(58) Field of Classification Search
CPC . G06T 2207/20132; G06T 3/00; G06T 7/194; G06T 7/50; G06V 20/70; G06V 40/161; G06V 40/171; G06V 2201/07; G06V 40/10

See application file for complete search history.

(56) References Cited

U.S. PATENT DOCUMENTS

| | | | |
|---|---|---|---|
| 10,972,655 B1 | 4/2021 | Ostap et al. | |
| 11,350,029 B1* | 5/2022 | Ostap ........................ | G06T 7/70 |
| 2011/0090303 A1 | 4/2011 | Wu et al. | |
| 2011/0285809 A1 | 11/2011 | Feng et al. | |
| 2016/0198036 A1* | 7/2016 | Zhao ........................ | G06F 3/012 |
| | | | 455/556.1 |
| 2019/0058847 A1 | 2/2019 | Mayer et al. | |
| 2019/0065895 A1 | 2/2019 | Wang et al. | |
| 2019/0215464 A1 | 7/2019 | Kumar et al. | |
| 2020/0211201 A1* | 7/2020 | Chiang ................. | G06T 11/001 |
| 2021/0165999 A1* | 6/2021 | Mirbach ................... | G06T 7/75 |
| 2022/0277166 A1* | 9/2022 | Zou ........................ | G06V 20/20 |

FOREIGN PATENT DOCUMENTS

| | | |
|---|---|---|
| EP | 3 627 832 A1 | 3/2020 |
| JP | 2019-050452 A | 3/2019 |
| TW | 202105996 A | 2/2021 |
| WO | 2010/141023 A1 | 12/2010 |

OTHER PUBLICATIONS

Invitation to Pay Additional Fees for International Application No. PCT/EP2022/064419 mailed Sep. 15, 2022.

International Search Report and Written Opinion for International Application No. PCT/EP2022/064419 mailed Nov. 18, 2022.

[No Author Listed], Neat Symmetry—Restoring Symmetry to Zoom Meetings. Neat. Youtube. Mar. 13, 2021. 56 pages. https://www.youtube.com/watch?v=0G4SLk8O85M (Last accessed Oct. 30, 2023).

PCT/EP2022/064419, Sep. 15, 2022, Invitation to Pay Additional Fees.

PCT/EP2022/064419, Nov. 18, 2022, International Search Report and Written Opinion.

Third Party Observation dated May 19, 2025 in connection with European Application No. 22733871.2.

[No Author Listed], Accelerometer. Wikipedia. 2025, 13 pages. URL:https://en.wikipedia.org/wiki/Accelerometer [printed on Apr. 27, 2025].

[No Author Listed], Field of View. Excerpt from SPIE Express. Field Guide to Geometrics Optics. SPIE Press. 2025, 2 pages. URL:https://spie.org/publications/spie-publication-resources/optipedia-free-optics-information/fg01_p27_field_of_view [accessed on May 21, 2025].

Awati, field of view (FOV). TechTarget. 2025, 4 pages. URL:https://www.techtarget.com/whatis/definition/field-of-view-FOV [printed on Apr. 22, 2025].

Notice of Reasons for Rejection mailed Mar. 17, 2026 for Japanese Application No. 2023-566604.

Written Opinion issued Mar. 21, 2026 for Singapore Application No. 11202308561T.

\* cited by examiner

100

VIDEO-CONFERENCE ENDPOINT

CROSS-REFERENCE TO RELATED APPLICATIONS

This application is a National Stage filing under 35 U.S.C. § 371 of International Application Serial No. PCT/EP2022/064419, filed May 27, 2022, which claims the benefit of priority to GB application number 2107641.9, filed May 28, 2021, each of which is herein incorporated by reference in its entirety.

FIELD OF THE INVENTION

The present invention relates to computer-implemented methods and a video conference endpoint.

BACKGROUND

In recent years, video conferencing and video calls have gained great popularity, allowing users in different locations to have face-to-face discussions without having to travel to a same single location. Business meetings, remote lessons with students, and informal video calls among friends and family are common uses of video conferencing technology. Video conferencing can be conducted using smartphones or tablets, via desktop computers or via dedicated video conferencing devices (sometimes referred to as endpoints).

Video conferencing systems enable both video and audio to be transmitted, over a digital network, between two or more participants located at different locations. Video cameras or webcams located at each of the different locations can provide the video input, and microphones provided at each of the different locations can provide the audio input. A screen, display, monitor, television, or projector at each of the different locations can provide the video output, and speakers at each of the different locations can provide the audio output. Hardware or software-based encoder-decoder technology compresses analogue video and audio data into digital packets for transfer over the digital network and decompresses the data for output at the different locations.

Some video conferencing systems include auto-framing algorithms, which find and frame people in a meeting room e.g. separate them out from the existing video stream and crop a region encompassing all of them or present them as individual video streams. In some cases, e.g. rooms with glass walls or doors, or open spaces, unwanted people outside of the call (i.e. not participating in it) may be detected and considered for framing. It is desirable then to enhance the reliability with which people are detected and framed when on a video call.

SUMMARY

Accordingly, in a first aspect, embodiments of the invention provide computer-implemented method of operating a video conference endpoint, the video conference endpoint including a video camera which captures images showing a field of view, wherein the method comprises:

receiving data defining of a spatial boundary within the field of view, the spatial boundary being at least in part defined by a distance from the video camera;

capturing an image of the field of view;

identifying one or more persons within the field of view of the video camera;

estimating a position of the or each person within the field of view of the video camera; and generating one or more video signals, which include one or more cropped regions corresponding to one or more persons determined to be within the spatial boundary, for transmission to a receiver.

By defining the spatial boundary, and framing only those determined to be within the boundary, the reliability with which people are framed when on a video call is enhanced.

Optional features of the invention will now be set out. These are applicable singly or in any combination with any aspect of the invention.

Generating the one or more video signals may include: determining, from the estimated position(s), that at least one of the one or more persons is within the spatial boundary; and framing the one or more persons who are determined to be within the spatial boundary to produce respective cropped regions. Generating the one or more video signals may include: framing the one or more persons within the field of view of the camera to produce one or more cropped regions; determining, from the estimated position(s), which of the one or more people are within the spatial boundary; and generating the one or more video signals based only on the cropped regions corresponding to the one or more persons within the spatial boundary.

The method may further comprise transmitting the or each video signal to a receiver. The receiver may be a second video conference endpoint connected to the first video conference endpoint via a computer network.

The steps of the method can, where appropriate, be carried out in any order. For example, receiving the data defining the spatial boundary may be performed after capturing an image of the field of view.

By framing, it may be meant extracting a region of the captured image containing the person determined to be within the spatial boundary, e.g. a cropped region. This frame or cropped region is smaller than the originally captured image, and the person being framed may be located centrally within the extracted region. In some examples, a or one of the cropped regions may contain only a single person. In some examples, a or one of the cropped regions may include a plurality of people each of whom has been determined to be within the spatial boundary. In one example, a single cropped region is extracted containing all of the people determined to be within the spatial boundary.

The method may further comprise a validation mode of: labelling each person in the image within the field of view of the camera according to whether they are within or outside of the spatial boundary; and presenting to an user the labelled image for validation. The user can then vary the data defining the spatial boundary to ensure that all people intended to be framed are within the spatial boundary.

Estimating the position of the or each person may be performed by measuring a distance between one or more pairs of facial landmarks of the respective person. For example, the estimation may be performed by obtaining average distances between one or more pairs of facial landmarks for humans, detecting these landmarks on a captured image, computing the distances between them on the image, estimating the position of the person relative to the camera based on a geometry of the camera image formation and camera parameters, and estimating the distance from the plurality of distances computing from each pair of facial landmark features.

Estimating the distance may include estimating an orientation of the face of the person relative to the camera, and selecting the pairs of facial landmarks used to estimate the position based on the estimated orientation.

Estimating the position of the or each person may include estimating an orientation of the camera using one or more accelerometers within the video conference endpoint.

Estimating the position of the or each person may include the use of one or more distance sensors within the video conference endpoint.

The spatial boundary is defined at least in part as a distance from a location of the camera. A distance may be a radial distance, which effectively creates a circular boundary on the floor. In another example, the spatial boundary specifies how far from the side and how far forward from the camera to create a rectangular boundary on the floor. The spatial boundary may also be defined at least in part by an angular extent of the captured image.

The method may include a user input step, in which a user provides the data defining the spatial boundary. The user may provide the data via a user interface, for example by defining distances to the side or forward from the camera via a user interface. The user may provide the data by entering the video conference endpoint into a data entry mode, in which the video conference endpoint tracks the location of the user, and the user prompts the video conference endpoint to use one or more locations of the user to define the spatial boundary.

The method may be performed on a video stream, whereby the positions of the or each person within the field of view of the camera are tracked, and the step of generating one or more video signals is repeated for plural images of the field of view.

In a second aspect, embodiments of the invention provide a video conference endpoint including a video camera configured to capture an image showing a field of view, and a processor, wherein the processor is configured to:

receive data defining a spatial boundary within the field of view, the spatial boundary being defined at least in part by a distance from the video camera;

obtain an image of the field of view from the video camera;

identify one or more persons within the field of view of the video camera;

estimate a position of the or each person within the field of view of the video camera; and generate one or more video signals, which include one or more cropped regions corresponding to one or more persons determined to be within the spatial boundary, for transmission to a receiver.

The video conference endpoint of the second aspect may be configured to perform any one, or any combination insofar as they are compatible, of the features of the method set out in the first aspect.

In a third aspect, embodiments of the invention provide a computer-implemented method of estimating the distance from a person to a camera, the method comprising:

(a) obtaining an image of the person by the camera;

(b) identifying a facial region of the person present in the camera;

(c) measuring a distance between each of a plurality of pairs of facial landmarks of the person;

(d) estimating a distance of the person from the camera using each of the measured distances;

(e) identifying a maximum and/or minimum estimated distance in step (d); and (f) estimating the position of the person relative to the camera based on the identified maximum and/or minimum distance.

In a fourth aspect, embodiments of the invention provide a video conference endpoint configured to perform the method of the third aspect.

The invention includes the combination of the aspects and optional features described except where such a combination is clearly impermissible or expressly avoided.

Further aspects of the present invention provide: a computer program comprising code which, when run on a computer, causes the computer to perform the method of the first and/or third aspect; a computer readable medium storing a computer program comprising code which, when run on a computer, causes the computer to perform the method of the first and/or third aspect; and a computer system programmed to perform the method of the and/or third aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Aspects and embodiments of the present invention will now be discussed with reference to the accompanying figures. Further aspects and embodiments will be apparent to those skilled in the art.

Figure 1:
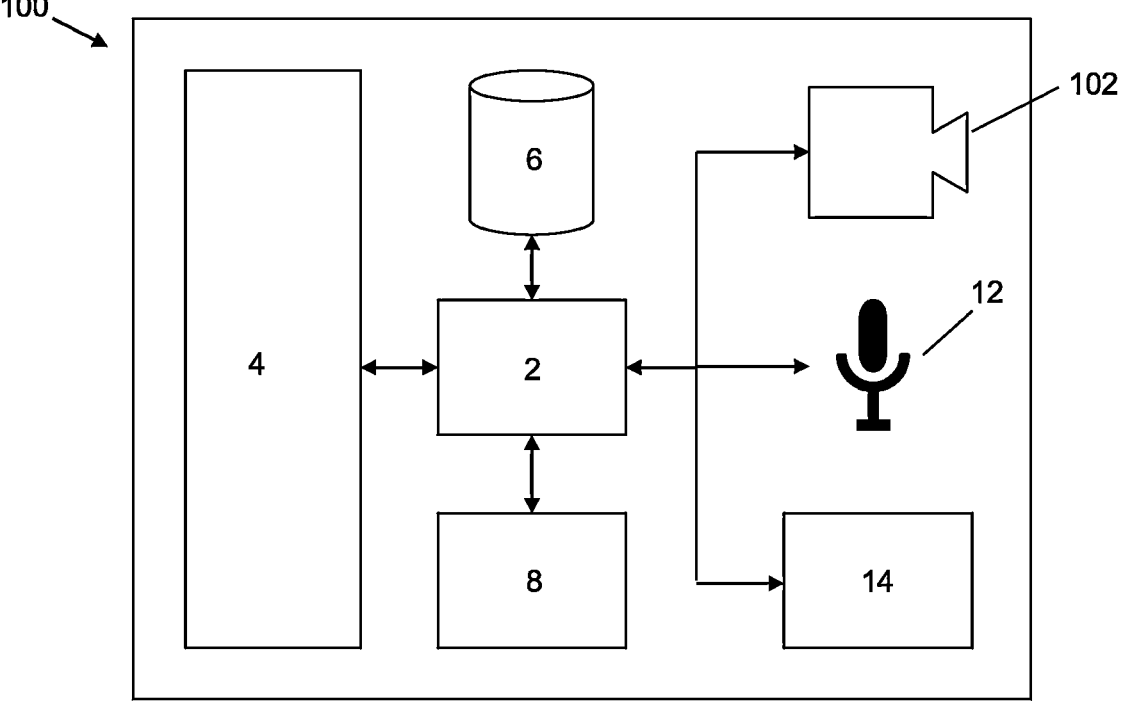
FIG. 1 shows a video conference endpoint.

FIG. 1 shows a video conference endpoint 100. The endpoint includes a processor 2, which is connected to volatile memory 4 and non-volatile memory 6. Either or both or volatile memory 4 and non-volatile memory 6 contain machine executable instructions which, when executed on the processor, cause it to perform the method discussed with reference to FIG. 2. The processor 2 is also connected to one or more video cameras 102, in this example there is a single camera but there may be a plurality of cameras offering differing fields of view or capture modes (e.g. frequency ranges). The processor is also connected to one or more microphones 12, and a human machine interface 14 (e.g. keyboard or touch-enabled display) through which a user can enter data. The processor is also connected to a network interface 8 to allow data to be transmitted across a network.

Figure 2:
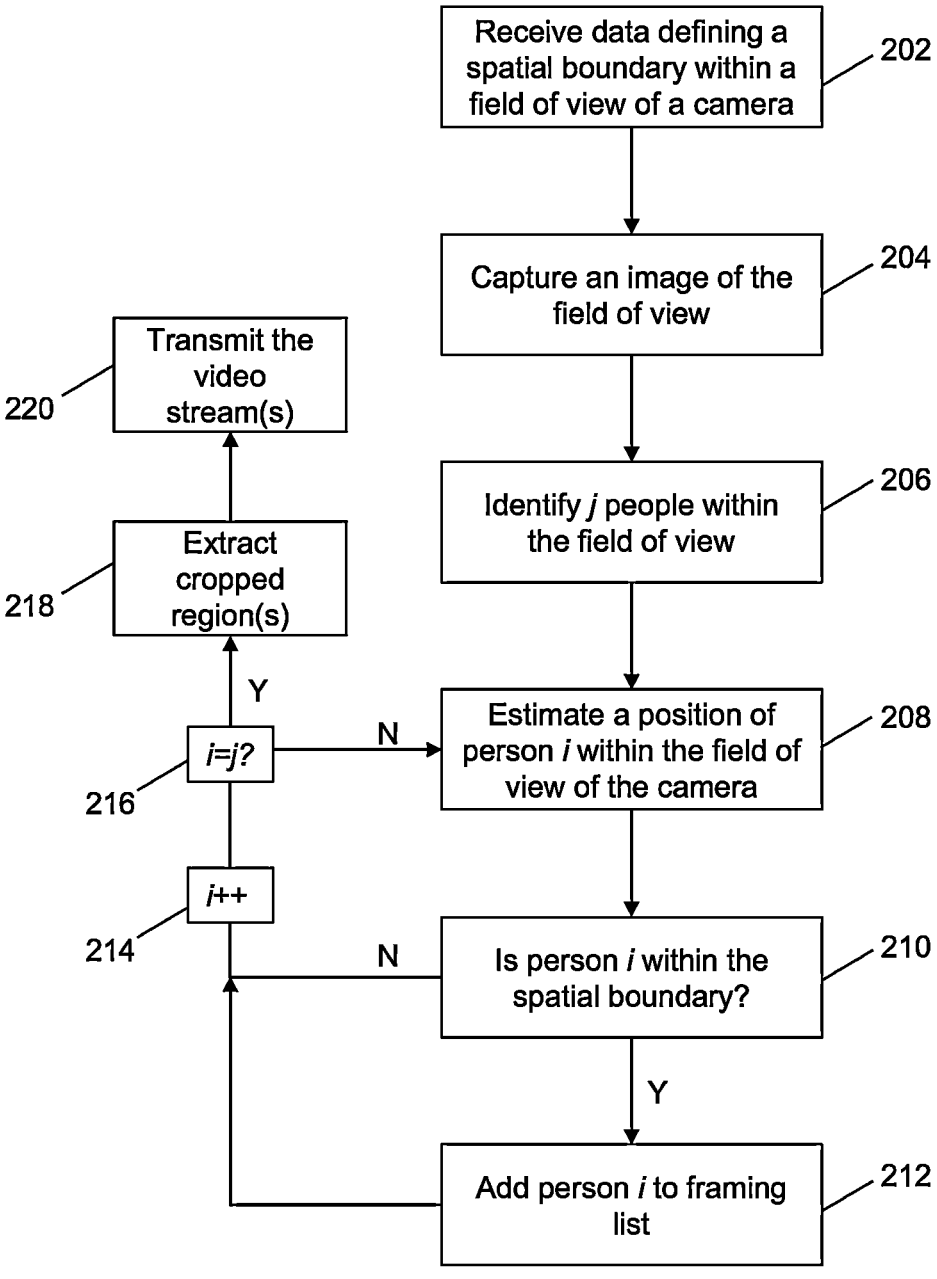
FIG. 2 shows a flow chart of a computer-implemented method.

FIG. 2 shows a flow chart of a computer-implemented method. In a first step 202, the processor receives data defining a spatial boundary within a field of view of the camera or cameras 102. This data can be received, for example, via the human machine interface 14, or via the network interface 8. This data can, for example, identify a maximum distance from the camera (e.g. in metres) that the spatial boundary bounds. The data could also, for example, identify a maximum angle from the camera that the spatial boundary extends. In one example, the data is received by the user entering the video conference endpoint into a data entry mode in which the processor 2 tracks the location of the user via the camera(s) 102. The user then prompts the video conference endpoint to use the current location of the user to define a vertex or bounding line of the spatial boundary. This prompt can be, for example, by the user gesturing in a predefined manner (e.g. crossing their arms in the form of an 'X' shape). The user can then move to another point and repeat the gesture to define a second vertex or bounding line and so on.

After the processor has received the data, the method moves to step 204 where an image is captured via the cameras of the field of view containing the spatial boundary. The processor then identifies all people within the field of view in step 206. This identification of people can be performed, for example, via a machine learning model trained to identify people within an image. In some examples, a trained convolutional neural network, such as a 'you only look once' (or YOLO) object detection algorithm, or a computer vision Haar Feature-based cascade classifier, or a histogram of orientated gradients, can be used to identify people within the image. The processor increments a counter j to indicate the number of people identified in the field of view of the camera. After that, the processor enters a loop defined by steps 208-216. In step 208, the position of person i is estimated within the field of view of the camera.

The estimation of a person's position or location in the field of view is, in some examples, performed in four steps: (i) estimate a distance from the person's face to the camera; (ii) compute a direction to the face of the person relative to the camera horizontal; (iii) compute the camera's orientation via the use of one or more accelerometers in the endpoint; and (iv) compute the direction of the person's face relative to a plane of the floor of a room in the field of view. The steps (i)-(iii) can be performed in any order. The first step can be done via different methods including: (a) using a time of flight sensor; (b) using stereovision from two or more cameras; (c) using a trained machine learning algorithm on the image; (d) detecting faces within the image, and using a face bounding box size; (e) detecting faces and then detecting facial landmarks such as eyes, nose, mouth, and using a pre-trained machine learning model to estimate the distance; and (f) detecting key features of a person, such as their head, ears, torso, and using a pre-trained machine learning model which assumes a constant distance between at least some of the key features.

It is also possible to estimate the person's position using a variation of (e). The distance between pairs of facial landmarks varies within 10% across the population. Some examples of these distances include the distance between the eyes, between one eye and the tip of the nose, between one eye and the mouth, between the top of the forehead and chin, and the entire width of the face. On a captured image, these landmarks are projected into the camera focal plane and therefore the distances between landmarks on the captured image depends on the camera view angle of the face. When a person turns their face to the side relative to the camera view, most of the above distances are shortened. Some are not however, including (for example) face length or distance from one visible eye to the mouth. Similarly, when a person looks up, their projected face length on the image is shortened but the face breadth and eye distances remain the same. If a person rotates their face but keeps their face frontal to the camera, the distance between the landmark distances such as eye distance remains the same. Assuming the distance between the landmarks is smaller than the distance from the face to the camera, the camera image formation allows formulae to be derived which relate the distance between the two landmarks in the real world and their distance on the image in pixel units. These formulae, sometimes referred to as equivalent formulae, represent the triangle proportionality property.

For example, taking f as the focal length (in meters) of the camera, $d_{real}$ as the distance in the real world of the two facial landmarks, $d_{image}$ as the distance on the image of the two facial landmarks in pixel length units, pixelSize as the size of a pixel (in meters) and d as the distance from the person to the camera, the following can be derived:

$$d \le d_{real} \times \frac{f}{d_{image} \times pixelSize}$$

The above "less than or equal to" becomes an equality, if the face is frontal, i.e. the line connecting the two facial landmarks is parallel to the image plane. It means that for each pair of landmarks, the value of the righthand side of the formula above gives one upper bound for the distance from the face to the camera. A plurality of pairs of landmarks and respective average values for $d_{real}$ may be used in this process. This allows the estimated distance to the camera to be derived. Variations to the above formulae are possible, for example replacing the focal length and pixel size with the horizontal field of view, HFOV, of the camera and the sensor resolution width in pixels:

$$d \le d_{real} \times \frac{resolution}{d_{image} \times \tan(HFOV)}$$

Horizontal field of view and sensor resolution width may be replaced by equivalent entities in vertical or diagonal directions.

The position of the person's face relative to the camera position is uniquely identified by knowing the distance and direction. The direction can be described by angles such as pan and tilt. The direction of the face relative to the camera horizontal plane may be computed from the pixel position of the face relative to the centre of the image. For example, if cx is the face position on the image relative to the centre pixel, the pan angle for a telelens can be computed as $$pan = atan\left(\frac{cx \times pixelSize}{f}\right)$$

Or $$pan = atan\left(cx \times \frac{HFOV}{resolutionWidth}\right)$$

For wide angle lenses following the fisheye model, the a tan and tan function may be omitted.

Video conference endpoints are often mounted tilted up or down with regards to the floor. The camera orientation may be computed from accelerometers within the endpoint which sense gravity to allow tilt angle to be derived. The direction with regards to the floor is derived from the above angles. For example, the pan angle relative to the floor is equal to the pan angle relative to the camera horizontal plane but the tilt angle relative to the floor is equal to the sum of the tilt angle relative to the camera horizontal plane and the camera tilt angle.

Once the person's position has been estimated, the method moves to step 210 where the processor determines whether person i is within the spatial boundary defined earlier. If so, 'Y', the method moves to step 212 and the person is added to a framing list (i.e. a list containing the person or people to be framed in one or more cropped regions). The method then moves to step 214 where the i counter is incremented. If the person is determined to be outside of the spatial boundary, 'N', the method moves directly to step 214 and step 212 is not performed.

Once the counter has been incremented, the processor determines if i=j in step 216. That is, have all identified people had their position estimated and compared to the boundary. If not, 'N', the method moves back to step 208 and the loop continues. It should be noted that in one example the method may loop first through all people identified in step 206 to estimate their position, and then loop through each estimated position to determine if they are within the spatial boundary. The method can then loop through all people determined to be within the spatial boundary and frame them. Once all people have had their positions estimated and the determination made as to whether to frame them or not, 'Y', the method moves to step 218 and the or each cropped region is extracted containing one or more of the people in the framing list. These cropped regions are then used to generate one or more single video streams, each video stream containing a respective crop region, or a composite video stream which contains a plurality of crop regions. These are transmitted in step 220.

In an alternative method, all of the people identified in step 206 are first framed i.e. a cropped region extracted for each person identified in step 206. Next, the method identifies each of the people within the spatial boundary, and separates those crop regions containing people within the spatial boundary from the remaining crop regions. Only the crop regions containing people within the spatial boundary are then used.

Figure 3:
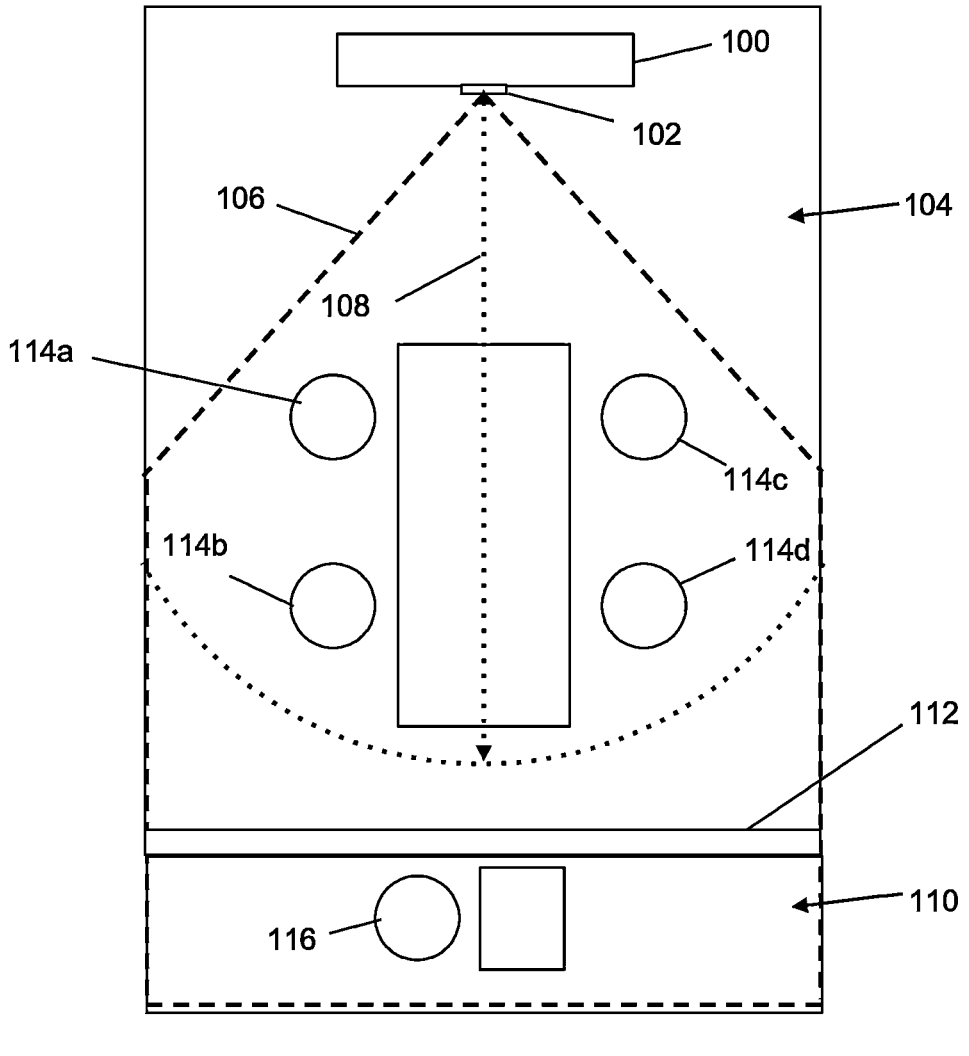
FIG. 3 shows a video conference suite including the video conference endpoint of FIG. 1.

FIG. 3 shows a video conference suite including the video conference endpoint 100 of FIG. 1. The camera 102 captures a field of view 106 (indicated by the dashed line) which includes a first room 104 and a second room 110. The first and second rooms are separated by a glass wall 112, and in this example room 104 is a video conference suite and room 110 is an office. A spatial boundary 108 (indicated by the dotted line) is defined as a maximum distance from the camera. In this example it means that people 114a-114d are within the spatial boundary, whilst person 116 (who is within the field of view 106 of the camera 102 but not within the first room 104) is not within the spatial boundary. People 114a-114d can therefore be framed by the video conference endpoint 100, and person 116 can be excluded.

Figure 4:
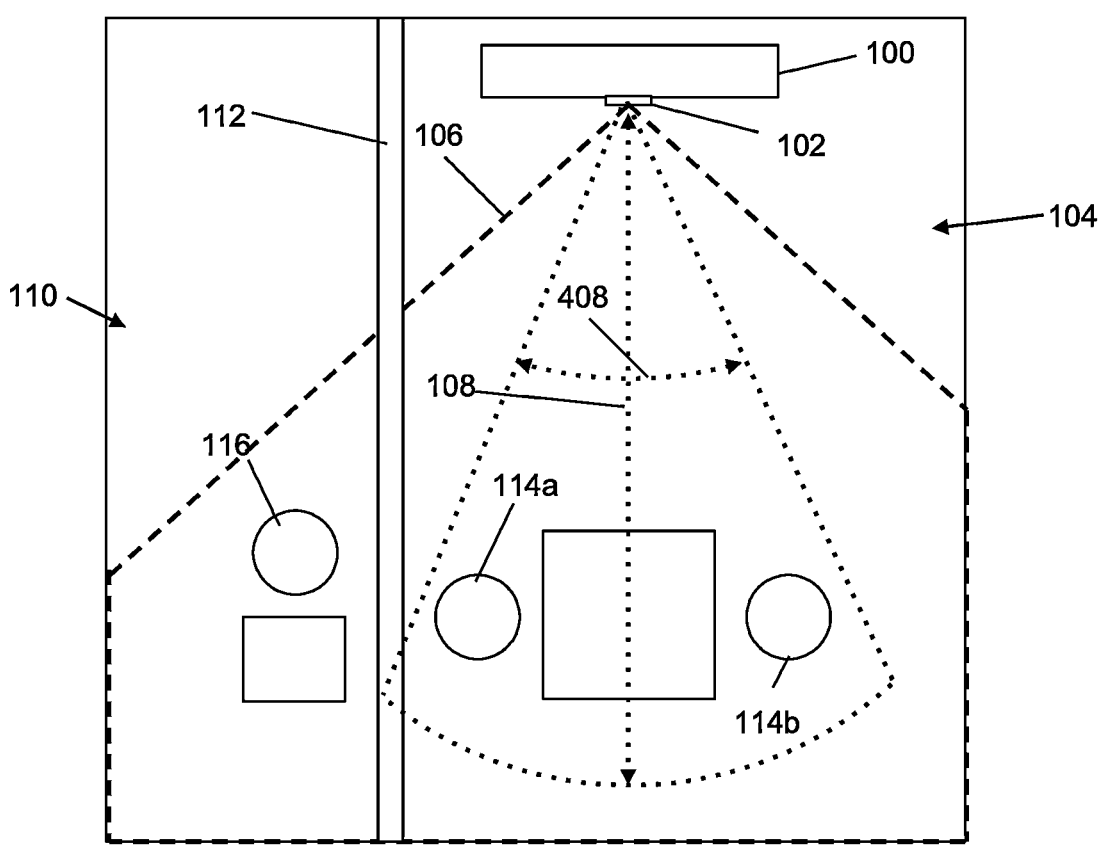
FIG. 4 shows a different video conference suite including the video conference endpoint of FIG. 1.

FIG. 4 shows a different video conference suite including the video conference endpoint of FIG. 1. Like features are indicated by like reference numerals. In contrast to the example shown in FIG. 3, here the spatial boundary is not only defined by the maximum distance 108, but further defined by a maximum angular extent 408 of the image. By defining the maximum angular extent appropriately, people 114a-114b can be defined as within the spatial boundary whilst person 116 can be excluded from the spatial boundary.

Figure 5:
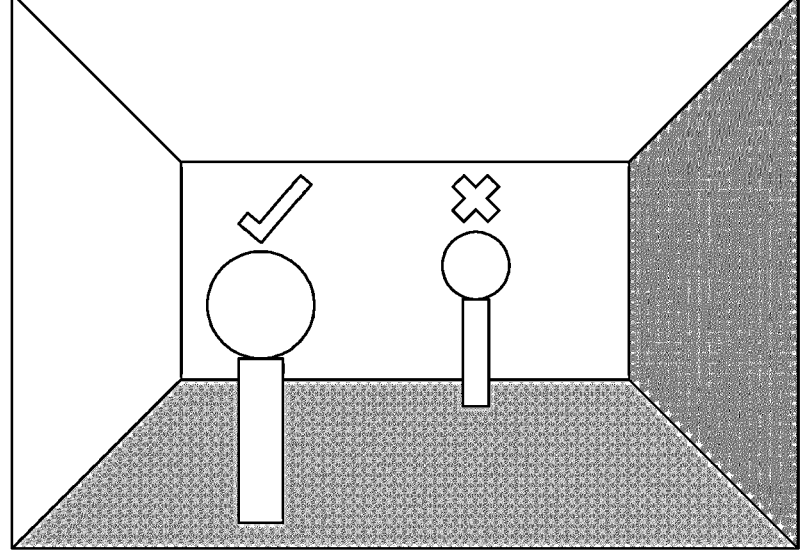
FIG. 5 shows a validation image displayed to a user.

FIG. 5 shows a validation image displayed to a user. A graphical indication that a person is inside or outside of the spatial boundary is provided and associated with the respective person. In this example, a tick symbol is provided adjacent to a person who is within the spatial boundary whilst a cross symbol is provided adjacent to a person who is outside of the spatial boundary. Other graphical indications can be provided, for example a bounding box around only people who are found to be within the spatial boundary or a bounding box around all detected people but with different colors for people inside and outside the boundary. This can allow the user to tailor the data defining the spatial boundary to appropriately exclude or include those people to be framed.

The features disclosed in the description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A computer-implemented method of operating a video conference endpoint, the video conference endpoint including a video camera which captures images showing a field of view, wherein the method comprises:
    receiving data defining of a spatial boundary within the field of view, the spatial boundary being at least in part defined by a distance from the video camera;
    capturing an image of the field of view;
    identifying one or more persons within the field of view of the video camera;
    estimating a position for each person identified within the field of view of the video camera;
    determining, from the estimated position of each person identified within the field of view of the video camera, which of the one or more identified persons are within the spatial boundary, and
    generating one or more video signals for transmission to a receiver, wherein the one or more video signals include one or more cropped regions corresponding to one or more persons determined to be within the spatial boundary, and when one or more of the identified persons within the field of view of the video camera are determined to be not within the spatial boundary, the one or more cropped regions exclude the one or more persons determined to not be within the spatial boundary.

2. The computer-implemented method of claim 1, wherein generating the one or more video signals includes:

determining, from the estimated position(s), that at least one of the one or more persons is within the spatial boundary; and framing the one or more persons who are determined to be within the spatial boundary to produce respective cropped regions.

3. The computer-implemented method of claim 1 including a step of transmitting the one or more video signal to the receiver.

4. The computer-implemented method of claim 1, further comprising a validation mode of:

labelling each person in the image within the field of view of the video camera according to whether they are within or outside of the spatial boundary; and presenting to a user the labelled image for validation.

5. The computer-implemented method of claim 1, wherein estimating the position of the or each person is performed by measuring a distance between one or more pairs of facial landmarks for the respective person.

6. The computer-implemented method of claim 5, wherein distances between a plurality of pairs of facial landmark features are measured, each distance is used to estimate a distance of the person from the video camera, and a maximum and/or minimum estimated distance among the estimated distances is used to estimate the position of the or each person.

7. The computer-implemented method of claim 5, wherein estimating the distance includes estimating an orientation of the face of the person relative to the camera, and selecting the pairs of facial landmarks used to estimate the position based on the estimated orientation.

8. The computer-implemented method of claim 1, wherein estimating the position of the or each person includes estimating an orientation of the camera using one or more accelerometers within the video conference endpoint.

9. The computer-implemented method of claim 1, wherein estimating the position of the or each person includes use of one or more distance sensors within the video conference endpoint.

10. The computer-implemented method of claim 1, wherein the spatial boundary is further defined at least in part by an angular extent of the captured image.

11. The computer-implemented method of claim 1, wherein the method includes a user input step, in which a user provides the data defining the spatial boundary.

12. The computer-implemented method of claim 11, wherein the user provides the data via a user interface.

13. The computer-implemented method of claim 11, wherein the user provides the data by entering the video conference endpoint into a data entry mode, in which video conference endpoint tracks a location of the user, and the user prompts the video conference endpoint to use one or more locations of the user to define the spatial boundary.

14. A video conference endpoint including a video camera configured to capture an image showing a field of view, and a processor, wherein the processor is configured to:

receive data defining a spatial boundary within the field of view, the spatial boundary being at least in part defined by a distance from the video camera;

obtain an image of the field of view from the video camera;

identify one or more persons within the field of view of the video camera;

estimate a position for each person identified within the field of view of the video camera;

determine, from the estimated position of each person identified within the field of view of the video camera, which of the one or more identified persons are within the spatial boundary, and generate one or more video signals for transmission to a receiver, wherein the one or more video signals include one or more cropped regions corresponding to one or more persons determined to be within the spatial boundary, and when one or more of the identified persons within the field of view of the video camera are determined to be not within the spatial boundary, the one or more cropped regions exclude the one or more persons determine to not be within the spatial boundary.

15. The video conference endpoint of claim 14, wherein generating the one or more video signals includes:

determining, from the estimated position(s), that at least one of the one or more persons is within the spatial boundary; and framing the one or more persons who are determined to be within the spatial boundary to produce respective cropped regions.

16. The video conference endpoint of claim 15, wherein the processor is configured to estimate the position of the or each person by measuring a distance between one or more pairs of facial landmark features of the respective person.

17. The video conference endpoint of claim 16, wherein the processor is configured to measure a plurality of distances between a plurality of pairs of facial landmark features, to estimate a distance of the person from the video camera using each of the measured distances, and use a maximum and/or minimum estimated distance among the estimated distances to estimate the position of the or each person.

18. The video conference endpoint of claim 14, wherein the video conference endpoint is connected to a receiver via a network, and the processor is configured to transmit the one or more video signals to the receiver.

19. The video conference endpoint of claim 14, wherein the processor is configured to perform a validation mode of:

labelling each person in the image within the field of view of the camera according to whether they are within or outside of the spatial boundary; and presenting to a user the labelled image for validation.

20. A computer-implemented method of estimating a distance from a person to a camera, the method comprising:

(a) obtaining an image of the person by the camera;

(b) identifying a facial region of the person present in the image;

(c) measure a distance between each of a plurality of pairs of facial landmarks of the person;

(d) estimating a distance of the person from the camera using each of the measured distances;

(e) identifying a maximum and/or minimum estimated distance in step (d); and (f) estimating a position of the person relative to the camera based on the identified maximum and/or minimum distance.

\* \* \* \* \*